Patented Sept. 5, 1950

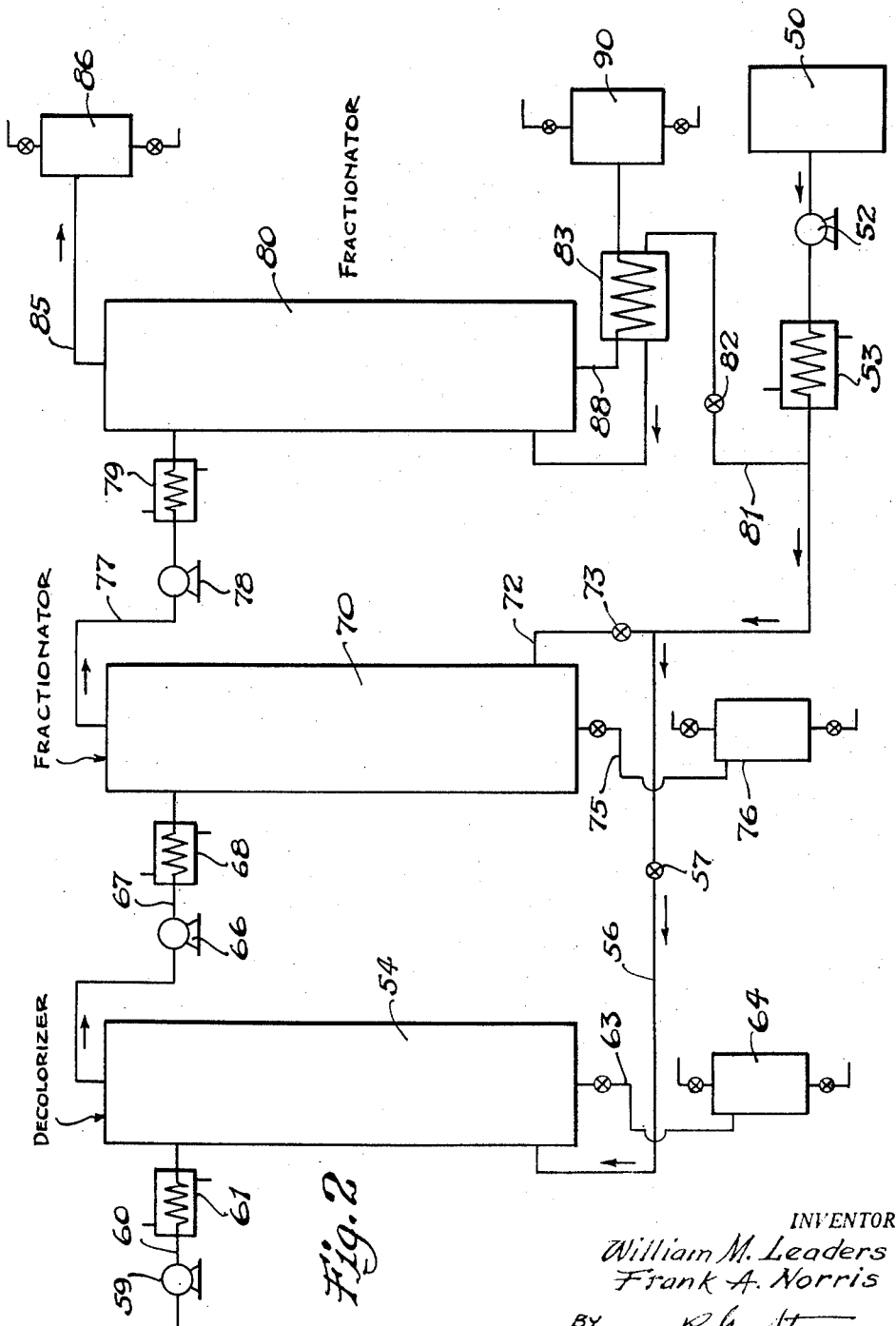

2,521,234

UNITED STATES PATENT OFFICE 2,521,234

SOLVENT FRACTIONATION OF FATTY MATERIAL

William M. Leaders, Houston, Tex., and Frank A. Norris, Chicago, Ill., assignors, by mesne assignments, to Swift & Company, a corporation of Illinois Application October 16, 1946, Serial No. 703,568

2 Claims. (Cl. 260—428.5)

This invention relates to the solvent treatment of fatty materials. More particularly, the invention is concerned with a separation, or fractionation, process for the recovery of vitamins, sterols and improved oil from fatty material.

Crude fatty material, such as vegetable and marine oils, contain tocopherols, or vitamin constituents, and sterols in varying amounts. There are also present in crude fatty material such undesirable substances as color bodies, gums, resins and free fatty acids. In treating crude fatty material, it is advantageous to recover therefrom the tocopherols and sterols in concentrated form, while at the same time producing a neutral oil having improved qualities of color and flavor and odor stability. Refined soybean oil particularly has the tendency of acquiring undesirable flavor and odor characteristics, known as "reversion," thus detracting from its value as a salad oil and as an ingredient in shortening and margarine products. Because of the disadvantage of flavor reversion the use of soybean oil in edible products is limited and the use thereof for edible purposes is less preferred to that of cottonseed oil, although the former is produced in greater quantities and hence is more available. Moreover, soybean oil is relatively rich in tocopherols and sterols. It is, therefore, advantageous to treat crude soybean oil to recover these materials therefrom in one fraction while simultaneously producing a stable and neutral oil in another fraction. In carrying out the process to produce a fraction rich in tocopherols and sterols and another fraction rich in improved oil, the steps in the process necessary to obtain one fraction often affect the nature of the other fraction. For example, decolorizing the oil before treating it to separate the tocopherols, tends to make the latter step more efficient and results in a greater yield of these materials. On the other hand, the more complete the removal of the tocopherols, the greater the flavor stability of the oil appears to be. Thus, in accomplishing the dual purposes of first obtaining vitamins, and second, an improved oil from crude fatty material, the steps in the process cooperate to produce the desired results.

An object of the invention is to recover vitamins and sterols from glyceride oils while at the same time producing a more stable and neutral oil.

Other objects and advantages of the invention will be apparent from the following description of the invention.

The invention contemplates treating crude fatty oils with a liquefied normally gaseous hydrocarbon under such conditions of temperature and pressure whereby the separation of the oils into a plurality of phases is effected. Further separation, or fractionation, of the phases to accomplish secondary separations may be carried out by altering the conditions of temperature, pressure and solvent ratio.

In accordance with the invention, a liquefied normally gaseous hydrocarbon, such as propane, and crude fatty material are introduced into a decolorizing or fractionating tower. Temperature and pressure conditions, together with solvent to oil ratio, are so maintained in the tower that the propane shows selective solvent action for the oil while throwing out of solution the undesirable impurities, such as gums, resins, color bodies and phosphatides. The majority of the oil in the liquid propane is then charged to a second fractionating tower, wherein by altering the temperature and pressure and the amount of solvent, a secondary separation of the oil into phases is accomplished. The phases are then separated and further fractionation thereof may be carried out.

More specifically, it is contemplated to treat crude glyceride oils with liquefied propane under conditions of temperature and pressure and solvent to oil ratio such that decolorization of the oil is effected. Along with the color bodies other impurities are removed from the oil in solution with the propane. The decolorized oil is subjected to fractionation under such conditions of solvent to oil ratio, temperature and pressure to selectively separate the vitamin material in one phase while leaving the bulk of the oil and sterols in the other phase. Generally the two phases thus produced are a lighter top phase, rich in vitamins, and a heavier bottom phase, containing a majority of the charged material including the sterols. The two phases are separated and the heavier fraction may be charged to a third operation wherein, under proper temperature and pressure conditions, a further fractionation of the oil may be effected to free the oil of free fatty acids and the remaining tocopherols and sterols. We have found that this separation makes possible the production of a highly neutral and stable oil.

Alternatively, the invention may be carried out by a process whereby the oil is decolorized and the resulting decolorized oil subjected to a solvent separation or fractionation operation under conditions such that the vitamins, sterols and fatty acids may be separated as one phase from the bulk of improved oil contained in a second phase. The phase containing the vitamins, sterols and fatty acids is then subjected to a fractionating step, whereby the vitamins are separated from the fatty acids and sterols. According to one method of operation the crude oil in the presence of liquefied propane is subjected to conditions of temperature and pressure and solvent to oil ratio such that decolorization of the oil is effected. The color bodies together with other highly propane-insoluble impurities are separated from the bulk of the oil. The decolorized oil and a major proportion of the solvent used in the decolorizer together with additional propane if necessary, is subjected to temperature and pressure conditions to decrease the solvent action of the propane, thereby selectively dissolving the vitamins, sterols and free fatty acids, thus effecting two phases, one of which is relatively rich in vitamins, sterols and fatty acids, and the other rich in a decolorized, neutral oil. The phase containing the vitamins is subjected to a further fractionating treatment, wherein the temperature and pressure are further increased to effect formation of two phases, one of which is relatively rich in vitamins and the other phase relatively rich in free fatty acids and the sterols. The sterols may then be separated from the free fatty acids and oil by conventional methods, such as molecular distillation or crystallization.

In order better to illustrate the operation of the invention, a description thereof is given in connection with the drawings.

Figure 2 shows diagrammatically a modified type of apparatus for carrying out another embodiment of the invention wherein a fraction containing the tocopherols, sterols and free fatty acids is separated and is then treated for the separation of the vitamins from the sterols and free fatty acids.

Figure 1:
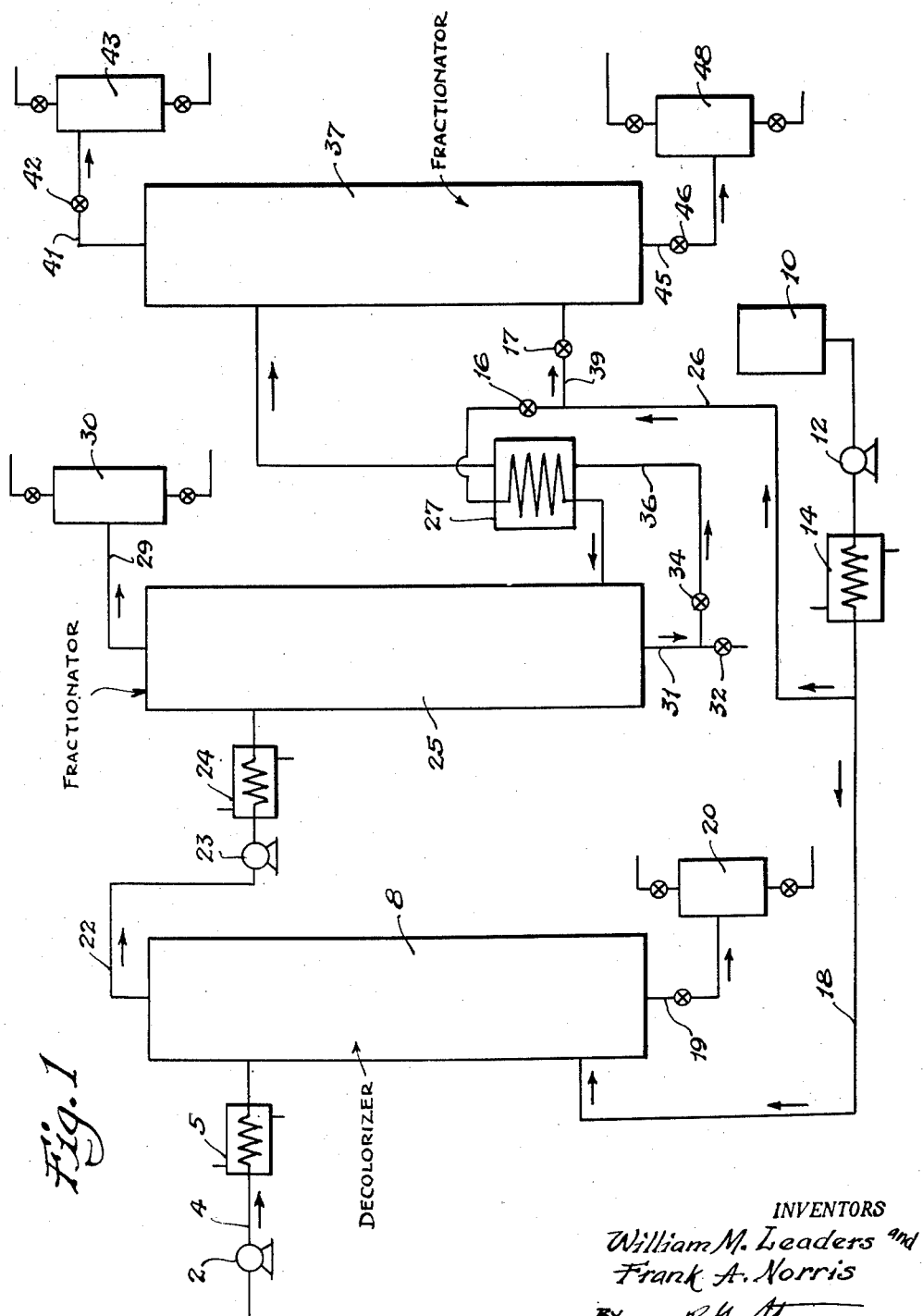
Figure 1 is a diagrammatic elevation of an apparatus for carrying out one embodiment of the invention wherein the tocopherols are separated prior to removal of free fatty acids and sterols.

Referring to Figure 1, crude oil, from a source not shown, is pumped into decolorizer 8 by means of pump 2 through line 4 and preheater 5. Simultaneously with the introduction of oil into tower 8, about 15 volumes of liquefied propane to 1 volume of oil from propane storage tank 10 is pumped by means of pump 12 through preheater 14 and line 18 into tower 8. Temperature and pressure conditions in decolorizer 8 are such that two phases are formed, usually a top lighter layer consisting of a major proportion of the oil in the bulk of the solvent, and a bottom heavier fraction comprising the color bodies and other impurities. The bottom layer is withdrawn through line 19 to still 20, wherein the solvent is recovered and may be reused in the process. The top fraction is pumped from tower 8 by means of pump 23 through line 22 and preheater 24 into tower 25. By suitable manipulation of valve 16 in line 26, additional solvent from tank 10 is pumped into the second tower 25 through line 26 and heat exchanger 27. Conditions of temperature and pressure are so adjusted in fractionator 25 that about 1 to 2 per cent of the charged material is soluble in the propane and appears in the top fraction. This cut, which is relatively rich in vitamin material, is withdrawn through line 29 and conducted into still 30, wherein the solvent is separated and may be recycled to the system. A larger proportion of the decolorized oil appearing in the bottom phase may be removed through line 31 controlled by valve 32. Alternatively, by suitable control of valves 32 and 34 on line 36 the bottom fraction, resulting from operations in fractionator 25, may be charged through line 36 and heat exchanger 27 to the top of tower 37. If desired, additional propane may be introduced into fractionator 37 through line 39 by appropriate manipulation of valve 17. In fractionator 37, operating temperatures are lowered to effect separation of a top layer relatively rich in free fatty acids and sterols and a bottom layer comprising a relatively stable, neutral oil. The top fraction is removed from fractionator 37 through line 41 provided with valve 42 and is introduced into still 43, wherein the solvent is removed from the fatty material for reuse in the process. The bottom fraction is withdrawn through line 45, provided with valve 46, and is taken to still 48 for the separation of solvent from the oil. The towers may be provided with an electric or steam jacket or any other suitable means to aid in the control of temperatures maintained therein.

Referring to Figure 2, propane from tank 50 is pumped into fractionator 54 by means of pump 52 through preheater 53 and line 56 by suitable control of valve 57. Simultaneously with the introduction of propane into tower 54, crude oil from source not shown is introduced therein by means of pump 59 through line 60 and preheater 61. Operating conditions in tower 54 are such that two phases are formed, a small bottom phase containing the color bodies and other impurities, and a top phase containing the bulk of the oil in decolorized condition. The bottom phase is continuously withdrawn through line 63 and conducted to still 64, wherein the solvent may be recovered and reused in the process. The decolorized oil is pumped by means of pump 66 through line 67 and preheater 68 into fractionator 70. Additional propane from tank 50 is introduced into tower 70 through line 72 by proper manipulation of valve 73. Operating conditions of temperature and pressure are increased in tower 70 in order to cause the formation of two phases, a top phase containing the vitamins, sterols and free fatty acids and a denser bottom phase containing the bulk of the oil. This oil may be withdrawn from tower 70 through line 75 and taken to still 76 wherein the oil may be separated from the solvent, which may be reused in the process. The top fraction in tower 70 is withdrawn therefrom through line 77 and by means of pump 78 sent through preheater 79 into fractionator 80. Additional propane may be introduced into tower 80 through line 81 and through heat exchanger 83 by suitable control of valve 82. The temperature and pressure in tower 80 are increased so that a top fraction rich in vitamin materials and a bottom fraction rich in fatty acids and sterols are obtained. The vitamin fraction is withdrawn from fractionator 80 through line 85 and conducted to still 86, wherein the solvent is removed. The bottom fraction is withdrawn from fractionator 80 through line 88, conducted through heat exchanger 83 and introduced into still 90 wherein the solvent may be recovered and reused in the process.

We have found that decolorization of the crude oil may be effected by employing an amount of solvent in a ratio ranging from about 10 to 20 of solvent to 1 of oil by volume. Temperature conditions in the decolorizer may range from about 155° F. to 170° F., with corresponding pressures of about 400 to 475 pounds per square inch absolute to keep the solvent in the liquid state. For most purposes, a temperature of about 160° F. and a pressure of about 425 pounds per square inch absolute, with a solvent to oil ratio of about 15 to 1, have been found to be satisfactory. Under these conditions, about 2 to 5 per cent of the charged oil is obtained as a bottom fraction.

In the second tower, or fractionator, temperatures of the solvent are so increased as to cause a majority of the vitamin material contained in the oil to be soluble in the propane while a majority of the oil is insoluble therein. We have found that about a 1 to 2 per cent cut obtained in the top fraction is suitable for most purposes, and may be effected by employing a temperature within the range of about 185° F. to 207° F., with corresponding pressures of about 540 to 630 pounds per square inch absolute. The solvent to oil ratio may vary from about 25 to 1 to as high as 100 to 1. A temperature of about 200° F., with a pressure of about 600 pounds per square inch, and a solvent to oil ratio of about 50 to 1, have been found satisfactory.

After leaving the second tower the oil, although decolorized, may still contain such impurities as free fatty acids which are less soluble in the propane than the vitamins under the operating conditions of the second tower. In order to produce a neutral oil these acids may be removed in the third fractionating step. Moreover, in some cases, especially when using soybean oil, it is advantageous to remove substantially all of the unsaponifiable material. We have found that treating soybean oil to effect a substantially complete removal of the unsaponifiable portion therefrom results in a relatively non-reverting soybean oil. The aforesaid results may be accomplished according to one method (Fig. 1) in a third tower by fractionation of the oil into a top fraction containing about 6 to 14 per cent of the oil charged to the tower, and in a bottom fraction containing a relatively non-reverting and neutral oil. Operating conditions in the third tower may range from about 180° F. to 195° F. with a corresponding pressure range of about 510 to 590 pounds per square inch, and a solvent to oil ratio of 15 to 1 to 30 to 1, depending on the size of the fractions desired. The size of the top fraction will be greater generally when it is desired to effect a substantially complete removal of the unsaponifiable portion of the oil, and not so large when it is desired to remove merely other impurities, such as free fatty acids. Thus, for example, in the case of soybean oil the improved oil is obtained by removing substantially all of the unsaponifiable portion therefrom, and in order to accomplish this result, operating conditions are varied to achieve a large top cut amounting to about 7 to 15 per cent based on the crude oil. When using oils, for example, sunflower and cottonseed, which do not present a serious reversion problem, the top cut may vary in size according to the free fatty acid content of the oil, removal of which produces a neutral oil.

When it is desired to accomplish removal of the free fatty acids along with the vitamins in the second tower (Fig. 2), and thus obtain the improved oil as a result of the second fractionating step, a bigger cut of the charged oil is made by maintaining the temperature between a range of about 180° F. to 195° F. with a corresponding pressure range of about 510 to 590 pounds per square inch. The preferred solvent to oil ratio may range from about 15 to 1 to 30 to 1, a ratio of about 25 to 1 being satisfactory. Under these conditions a top fraction containing from about 5 to 15 per cent of the charged oil, including the vitamins, sterols and free fatty acids, and a bottom fraction containing the improved oil, are obtained.

In order to separate the vitamin materials from the free fatty acids and sterols obtained in accordance with the last mentioned procedure, the fraction containing these substances is then subjected to a further fractionating treatment, involving an increase in temperature and pressure so as again to effect the formation of two phases, one of which is relatively rich in vitamins and the other in free fatty acids and sterols. In the third fractionating tower the solvent to oil ratio may range from about 25 to 1 to 100 to 1. The temperature may range from about 185° F. to about 207° F. with a corresponding pressure range of about 540 to 630 pounds per square inch. A temperature of about 200° F. with a corresponding pressure of about 600 pounds per square inch and a solvent ratio of 50 to 1 have been found satisfactory.

Although propane is the preferred solvent, we may employ other normally gaseous hydrocarbons or combinations thereof to good advantage, for example, ethane, propylene, isobutane, and butylene.

As examples of oils that may be used in accordance with the herein described process may be mentioned soybean, wheat germ, linseed, sunflower, cottonseed, corn, rice bran, rapeseed, peanut and marine oils.

As an example of the invention, a crude peanut oil, having a tocopherol content of about 0.05 per cent, and being not darker than 19 F. A. C., was continuously charged to a fractionating tower countercurrent to the simultaneous introduction therein of liquefied propane. The solvent was added in a ratio of 15 volumes of propane to 1 volume of crude oil. An overhead take-off temperature of 165° F. and a bottom temperature of 162° F. were maintained in the tower. Pressure was around 450 pounds per square inch. Under these conditions, a bottom phase amounting to about 4 per cent of the charged oil and containing color bodies, gums, phosphatides and other impurities insoluble in propane, was obtained. The overhead fraction, containing a majority of solvent and oil, was removed from the top of the tower and introduced directly into a second fractionating tower. The ratio of propane to oil was increased to 25 to 1 by the introduction into the tower of additional propane. The temperature was raised to 205° F. at the top of the tower and 201° F. at the bottom thereof. A pressure of 615 pounds per square inch was maintained on the solvent to keep it liquid. Under these conditions a top fraction was obtained containing about 0.5 per cent of the material charged to the tower. This cut, on analysis, contained 96 per cent of the vitamins in the oil. The vitamin-free material had a color of 35 Y and 3 R on the Lovibond scale, and was suitable as an ingredient in shortening products.

As another example illustrative of the invention, crude soybean oil having a tocopherol content of about 0.11 per cent and a free fatty acid content of about 1 per cent, and being not darker than 25 F. A. C., was treated with 20 volumes of liquid propane in a countercurrent fractionating tower at an overhead take-off temperature of 160° F. and a bottom temperature of 157° F. and at a pressure of around 425 pounds per square inch. As a result of these operating conditions, a bottom fraction amounting to about 4 per cent of the charged oil and containing color bodies together with other propane-insoluble impurities, was obtained. The overhead fraction, comprising the remainder of the charged oil and the bulk of the solvent, was withdrawn from the top of the tower and introduced into a second fractionating tower near the top thereof. Additional propane was added to the second tower so that the overall solvent to oil ratio was 75 to 1. A temperature in the tower of 200° F. at the top and 196° F. at the bottom, with a corresponding pressure of 600 pounds per square inch, were maintained in the tower. Under these operating conditions a top fraction containing about 1.5 per cent of the charged oil was obtained. This fraction contained about 97 per cent of the tocopherols present in the original oil. The bottom fraction, containing the bulk of the oil, was introduced into a third fractionating tower and the solvent to oil ratio adjusted to about 15 to 1. Temperatures in this fractionating step were lowered to about 190° F. and 185° F. at the top and bottom of the column, respectively, with a corresponding pressure of about 575 pounds per square inch. A top fraction containing 10 per cent of the oil charged to the tower was obtained. After removing the solvent, the free fatty acid content of the cut was neutralized, and the resulting product used as an ingredient in paint. The bottom fraction contained about 85 per cent of the original charged soybean oil and had a color of 40 Y and 4 R on the Lovibond scale. This oil remained substantially odorless and tasteless after keeping at room temperatures for a period of 120 days. A refined control sample of the soybean oil reverted after 1 day at room temperatures.

As another example of the invention, an amount of linseed oil having a tocopherol content of about 0.07 per cent and a free fatty acid content of 8 per cent, and being not darker than 41 F. A. C., was continuously charged to a fractionating tower countercurrent to the simultaneous introduction into the tower of propane in a ratio of 20 volumes of propane to 1 of oil. The tower was operated at a temperature of 155° F. under a pressure of 400 pounds per square inch. A 5 per cent bottom fraction containing the propane-insoluble impurities was obtained. A top fraction was charged to a second tower, together with additional propane, in a ratio of 50 to 1. In the second tower the temperature was raised to 195° F. and the pressure to 590 pounds per square inch, under which conditions a top fraction containing 1 per cent of the oil charged to the tower, having about 98 per cent of the tocopherols in the oil, was obtained. The bottom fraction was subjected to a third fractionating step, wherein the solvent to oil ratio was 20 to 1, and a temperature of 185° F., with a pressure of 540 pounds per square inch, was employed. Under these operating conditions, a top fraction containing 14 per cent of the oil charged to the tower was obtained. The bottom fraction contained a substantially neutral oil, which was suitable for edible use.

As a further example illustrating the operation of the invention, a batch of soybean oil, being not darker than 19 F. A. C. and having a free fatty acid content of 1.6 per cent and an unsaponifiable portion of 1.3 per cent, was continuously introduced into a tower, into which there was also added liquid propane in a ratio of 12 volumes to 1 of oil. The temperature was maintained at 160° F. and the pressure at 425 pounds per square inch. As a result of these operating conditions a bottom fraction amounting to 3.5 per cent of the charged oil, containing the color bodies and other impurities, was obtained. The top fraction comprising the bulk of decolorized oil was continuously charged to a second fractionating tower together with additional solvent, so that the solvent to oil ratio by volume was 25 to 1. The temperature in this tower was increased to 190° F., and the pressure to 575 pounds per square inch to maintain the solvent in the liquid state. A top fraction amounting to 15 per cent of the charged material and comprising vitamins, sterols and free fatty acids was obtained. The bottom fraction, on the other hand, contained an improved neutral and relatively non-reverting oil. The top fraction was then introduced into a third tower. Additional propane was added, so that the solvent to oil ratio was 50 to 1. The temperature was raised to 195° F. with a corresponding pressure range of 590 pounds per square inch, under which conditions a top cut of about 1 per cent of the charged material was obtained. This top fraction was rich in vitamin materials, while the bottom fraction was relatively rich in fatty acids and sterols. The bottom fraction was subsequently subjected to molecular distillation to separate the sterols from the fatty acids. A yield of 0.7 per cent of sterols based on the portion of unsaponifiable material present in the original crude oil was obtained.

Obviously, many modifications and variations of the invention, as hereinabove set forth, may be made without departing from the spirit and scope thereof, and therefore only such limitations should be imposed as are indicated in the appended claims.

We claim:

1. A method of producing a relatively nonreverting soybean oil having substantially improved odor and flavor characteristics, which comprises: contacting in a fractionating zone a crude soybean oil having poor flavor and odor stability and containing color bodies and other nonsaponifiable impurities with from 10 to 20 times its volume of liquefied normally gaseous hydrocarbon at a temperature of between approximately 155° and 170° F. and at a pressure of between approximately 400 and 475 pounds per square inch to form upper and lower phases, the lower of said phases containing between 2 and 5 per cent of the crude soybean oil having included therein substantially all the color body impurities, and the upper of said phases comprising the remainder of the unimproved soybean oil substantially free of color bodies; contacting the upper of said phases with additional liquefied normally gaseous hydrocarbon in a fractionating zone to increase the hydrocarbon-oil ratio of between 15:1 and 100:1 and at a pressure of between approximately 540 to 630 pounds per square inch at a temperature between about 185° and 207° F. to form upper and lower phases, the upper of said phases comprising approximately 1 to 2 per cent of the soybean oil, and the lower of said phases containing the remainder of the soybean oil including therein substantial amounts of the unsaponifiable impurities; contacting the lower of said phases containing the major proportion of the soybean oil with additional liquefied normally gaseous hydrocarbn sufficient to increase the hydrocarbon-oil ratio to between approximately 15:1 and 30:1 at a temperature of between approximately 180° and 195° F. and a pressure of between approximately 510 and 590 pounds per square inch to form upper and lower phases, the upper of said phases comprising a hydrocarbon solution of between 7 to 15 per cent of the soybean oil having included therein substantially all the nonsaponifiable impurities remaining in the soybean oil, and the lower of said fractions comprising a relatively nonreverting soybean oil substantially free of nonsaponifiable impurities; and recovering the lower of said phases substantially free of hydrocarbon and impurities, whereby a relatively nonreverting soybean oil having greatly improved flavor and odor characteristics is obtained.

2. A method of producing a relatively nonreverting soybean oil having substantially improved odor and flavor characteristics, which comprises: contacting in a fractionating zone crude soybean oil having poor flavor and odor stability and containing color bodies and other nonsaponifiable impurities with between 10 and 20 times its volume of liquefied normally gaseous hydrocarbon at a temperature of between approximately 155° and 170° F. and a pressure of between approximately 400 and 475 pounds per square inch to produce upper and lower phases, the lower of said phases containing between approximately 2 and 5 per cent of the soybean oil having therein substantially all the color bodies, and the upper of said phases containing the remainder of said soybean oil and substantially all the remaining nonsaponifiable impurities; contacting the upper of said phases with additional liquefied normally gaseous hydrocarbon in a fractionating zone sufficient to increase the hydrocarbon oil ratio to between approximately 15:1 and 30:1 at a temperature of between approximately 180° and 195° F. and a pressure of between approximately 510 and 590 pounds per square inch to form upper and lower phases, the upper of said phases containing between approximately 5 and 15 per cent of the soybean oil having included therewith substantially all the remaining nonsaponifiable impurities in said vegetable oil, and the lower of said phases comprising the improved relatively nonreverting soybean oil substantially free of nonsaponifiable impurities; and recovering the lower of said phases substantially free of hydrocarbon and impurities, whereby a relatively nonreverting soybean oil is obtained which has greatly improved flavor and odor characteristics.

WILLIAM M. LEADERS.
FRANK A. NORRIS.

REFERENCES CITED

The following references are of record in the file of this patent:

UNITED STATES PATENTS

| Number | Name | Date |
|---|---|---|
| 2,118,454 | Schaafsma | May 24, 1938 |
| 2,329,889 | Ewing | Sept. 21, 1943 |
| 2,394,968 | Van Orden | Feb. 12, 1946 |
| 2,432,021 | Larner | Dec. 2, 1947 |